A. O. LUNDELL.
EVISCERATOR'S SANITARY MOVABLE PLATFORM.
APPLICATION FILED JULY 3, 1920.
1,413,673.
Patented Apr. 25, 1922.
4 SHEETS—SHEET 4.
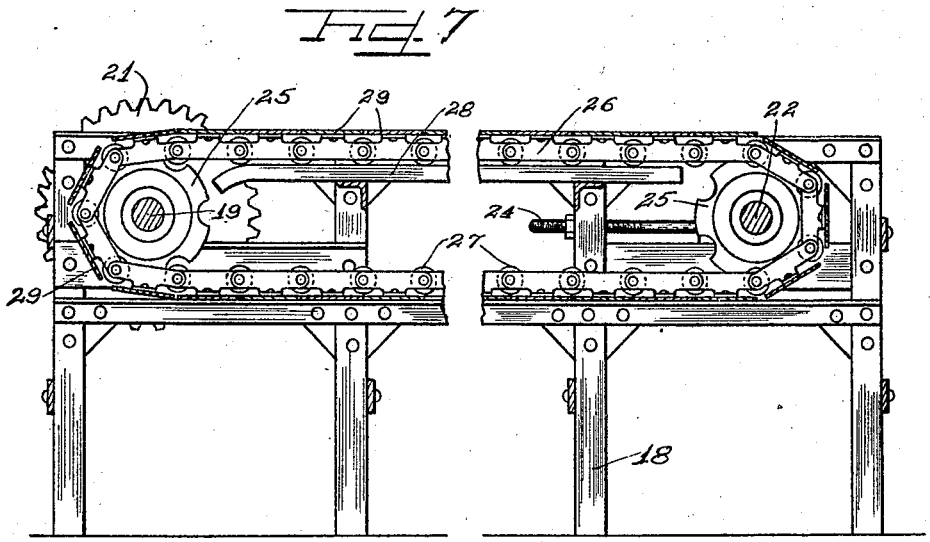
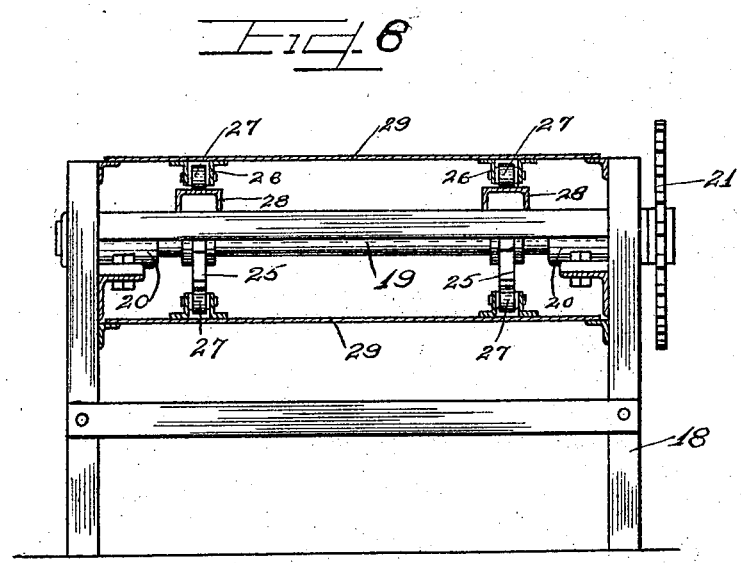

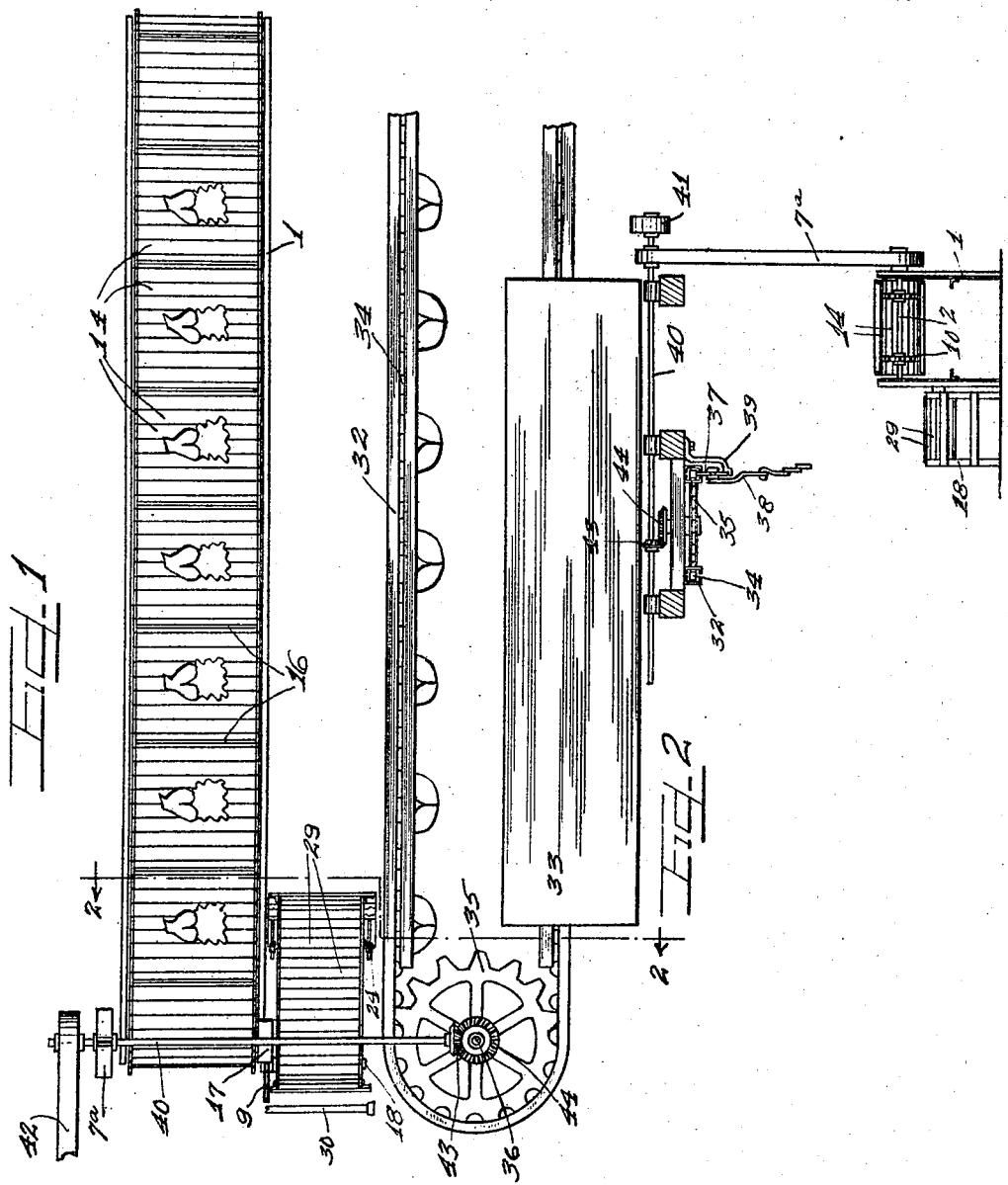

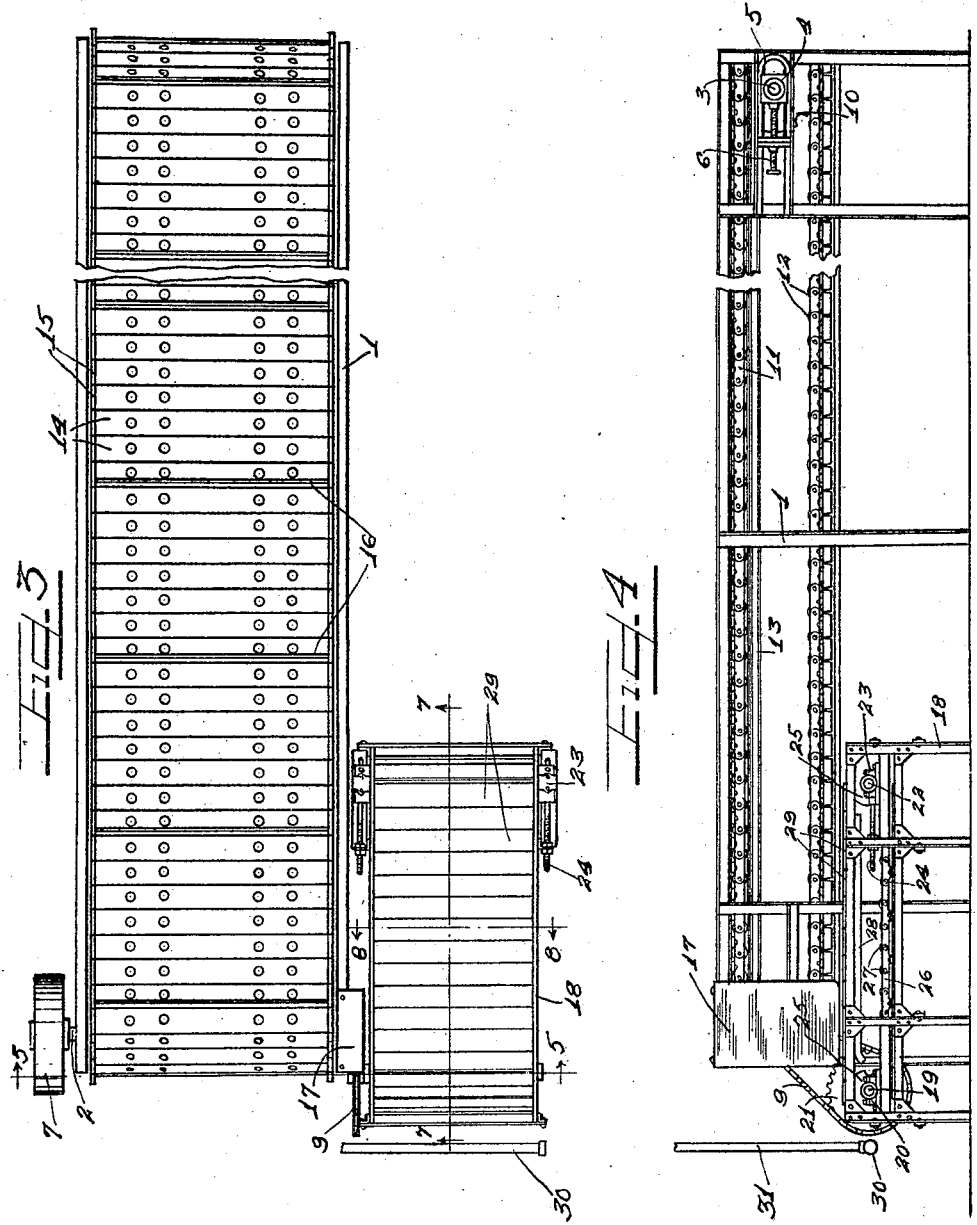

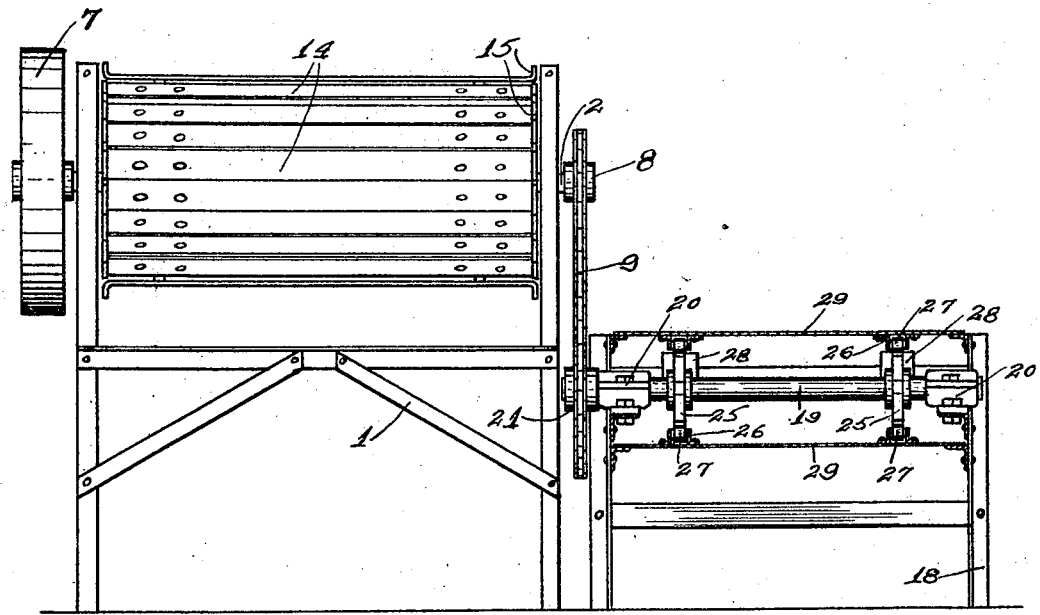
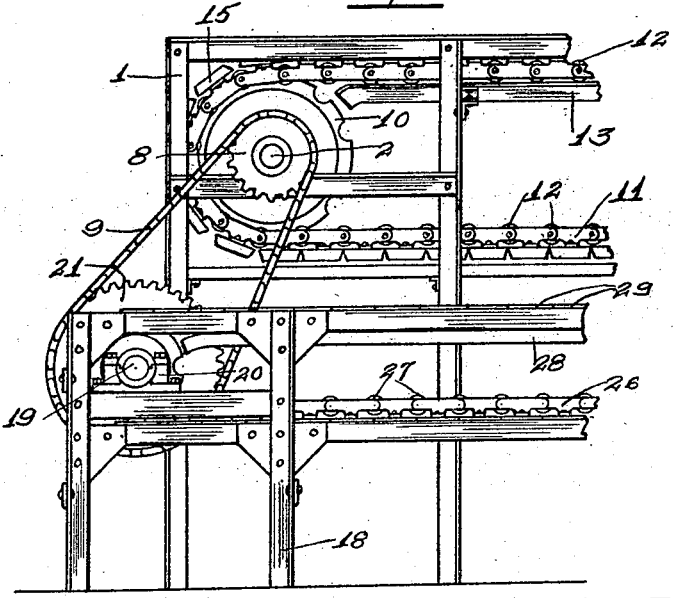

UNITED STATES PATENT OFFICE.

ALVIN O. LUNDELL, OF CHICAGO, ILLINOIS, ASSIGNOR TO THE ALLBRIGHT-NELL CO., A CORPORATION OF ILLINOIS.

EVISCERATOR'S SANITARY MOVABLE PLATFORM.

1,413,673.  Specification of Letters Patent.  Patented Apr. 25, 1922.

Application filed July 3, 1920. Serial No. 393,942.

*To all whom it may concern:*

Be it known that I, ALVIN O. LUNDELL, a citizen of the United States, and a resident of the city of Chicago, in the county of Cook and State of Illinois, have invented certain new and useful Improvements in an Eviscerator's Sanitary Movable Platform; and I do hereby declare that the following is a full, clear, and exact description of the same, reference being had to the accompanying drawings, and to the numerals of reference marked thereon, which form a part of this specification.

This invention relates more particularly to an improved type of a movable endless platform adapted to be used in combination with a viscera table and with a carcass conveyor and simultaneously operable therewith but at a reduced rate of speed to permit an eviscerator to stand upon the endless platform and be carried thereby while eviscerating carcasses the removed viscera of which are deposited for inspection in separated compartments of the viscera table.

It is an object of this invention to provide an improved device for eviscerating carcasses in a sanitary manner.

It is also an object of this invention to provide an eviscerator's movable, sanitary platform in combination with a viscera inspection table and acting to support the eviscerator while removing the viscera from carcasses for deposit on the inspection table.

Another object of the invention is to provide a movable eviscerating platform adapted to be operated simultaneously with a viscera table, but at a reduced rate of speed to permit an eviscerator standing on the movable platform to remove the viscera from carcasses carried along by an overhead conveyor.

A further object of this invention is to provide a movable eviscerating platform whereby an eviscerator on the movable platform may conveniently handle and eviscerate carcasses and deposit the removed viscera on an endless viscera inspection table.

It is furthermore an object of the invention to provide a slowly moving eviscerating platform whereon an eviscerator may stand to remove the viscera from a carcass for deposit on a traveling inspection table.

It is a further object of the invention to provide a machine wherein a viscera conveyor and a carcass conveyor traveling at the same rate of speed are arranged with a movable eviscerating platform disposed therebetween and operable at a lower rate of speed, and having means associated therewith for spraying the same to keep the platform in a sanitary condition so that viscera accidentally falling thereon will not be contaminated.

It is an important object of this invention to provide a machine wherein carcasses conveyed by a movable overhead conveyor adjacent a traveling table are adapted to have the viscera removed therefrom and placed upon the table by an eviscerator stationed on a sanitary traveling platform driven simultaneously with the table and conveyor.

Other and further important objects of this invention will be apparent from the disclosures in the specification and drawings.

The invention (in a preferred form) is illustrated in the drawings and hereinafter more fully described.

On the drawings:

Figure 1 is a top plan view of a machine provided with an eviscerating platform embodying the principles of this invention.

Figure 2 is a sectional view taken on line 2—2 of Figure 1, showing parts in elevation.

Figure 3 is a top plan view of the viscera table and the traveling eviscerator's platform.

Figure 4 is a side elevation thereof.

Figure 5 is a sectional end view taken on line 5—5 of Figure 3.

Figure 6 is a fragmentary side elevation of one end of the machine with the driving chain housing removed.

Figure 7 is an enlarged fragmentary section taken on line 7—7 of Figure 3.

Figure 8 is an enlarged transverse section taken on line 8—8 of Figure 3.

As shown on the drawings:

The viscera carrier or table comprises a supporting frame 1 having a transverse shaft 2 journalled in suitable stationary bearings at one end thereof, and a transverse shaft 3 journalled in adjustably supported bearings 4 at the opposite end of said frame. The bearings 4 are slidably disposed within guide members 5 and are adapted to be adjusted by means of screw bolts 6. Keyed or otherwise secured on one projecting end of the shaft 2 is a driving pulley or wheel 7 adapted to be driven by means of a power belt 7ª. A sprocket gear 8 is secured on the other projecting end of the shaft 2 and has an endless sprocket chain 9 trained therearound.

Secured on each of the shafts 2 and 3 are sprocket wheels 10, around which conveyor chains 11 are trained. The chains 11 are provided with rollers 12, which are adapted to run on guide tracks or rails 13 secured longitudinally of the supporting frame 1. Attached transversely of the chains 11 are a plurality of flat cross members, slats or cleats 14 provided at both ends with integral outwardly turned flanges 15. The slats 14 form a movable endless viscera conveyor or table having compartments formed by rigidly securing to certain of the slats 14, transverse partitions or plates 16. A shield or housing 17 is secured to the frame 1 to enclose the sprocket gear 8 and the upper portion of the driving chain 9.

Positioned adjacent one side of the loading end of the viscera carrying machine is an eviscerating device comprising a supporting frame 18. A shaft 19 is journalled in stationary bearings 20 supported on the frame 18 at the loading end thereof. The rear or inner end of the shaft 19 projects beyond the side of the supporting frame 18 and has secured thereon a large sprocket gear 21. The driving sprocket chain 9 is trained around the gear 21 to transmit a drive from the pulley 7 to the shaft 19 at a rate of speed less than the speed of rotation of the shaft 2. A transverse shaft 22 is journalled in adjustable bearings 23 at the end of the frame 18 opposite the shaft 19. The bearings 23 are slidably mounted in horizontal members of the frame 18 and are adapted to be adjusted by means of screw bolts 24, which have threaded engagement with upright members of the frame 18.

Rigidly secured on each of the shafts 19 and 22 are sprocket gears or wheels 25, around which endless conveyor chains 26 are trained. The chains 26 are equipped with rollers 27, which run on guide tracks or rails 28 secured longitudinally on the supporting frame 18. Attached transversely to the chains 26 are a plurality of adjacently disposed flat cross members, cleats or slats 29. The slats 29 and the chains 26 form a movable endless platform whereon a butcher or an eviscerator is permitted to stand while removing viscera from carcasses. The removed viscera are placed upon the movable conveyor or table 14 in the compartments which serve to keep the viscera of different animals separated from one another to eliminate any possibility of healthy viscera from becoming contaminated by diseased viscera.

A perforated horizontal steam or hot water pipe 30 is disposed horizontally across one end of the eviscerating platform. The pipe 30 is connected with a steam or hot water supply pipe 31.

As shown in Figures 1 and 2, the viscera table and the eviscerating platform are used in combination with an overhead carcass conveyor. A conveyor track 32 is provided and leads from a carcass scalding and dehairing machine 33. Traveling in said track 32 is an endless conveyor chain 34 trained at one end around a sprocket wheel 35 mounted on a vertical shaft 36. The sprocket chain 34 has depending pushers or fingers 37 secured thereto, each of which engages a carcass carrying gambrel carriage 38 traveling on a guide rail 39.

A horizontal drive shaft 40 is journalled above the machine and is provided on one end with a drive pulley 41, driven by a belt 42 connected with a suitable source of power. Secured on the shaft 40 is a smaller pulley around which the belt 7ª is trained to permit a drive to be imparted to the viscera inspection table. A bevel pinion 43 is mounted on the shaft 40 and meshes with a bevel gear 44 on the shaft 36 for driving the carcass conveyor at the same rate of speed as that of the inspection table.

The operation is as follows:

The inspection device comprises the endless traveling conveyor or table 14, which is divided into compartments each adapted to receive an individual viscera. The overhead conveyor is adapted to carry carcasses past the movable platform 29 supported on the frame 18. An eviscerator or butcher is permitted to stand on the platform 29 so that the viscera may be removed, by the eviscerator, from a moving carcass. The removed viscera is deposited by the eviscerator into one of the compartments of the inspection table 14. The successive table compartments are each filled with a viscera from the carcass positioned opposite it on the conveyor. The eviscerated carcasses are carried along by the overhead conveyor adjacent the traveling conveyor table opposite or adjacent their respective viscera. The various viscera are carried past an inspector who stands beside the traveling table and inspects the viscera. If the viscera are free from disease or other objections, they are passed on to be discharged. If, however, a viscera is found to be diseased or objectionable for other reasons, it is tagged as it is conveyed along, as is also the respective carcass which is opposite the viscera and is carried by the overhead carcass conveyor.

Attention is particularly directed to the arrangement whereby the eviscerator is permitted to stand upon the movable platform 29 as the viscera is removed from a moving carcass. This arrangement allows the removal of a viscera to be conveniently performed by an eviscerator since the platform

29 is positioned between the moving table 14 and the overhead conveyor. A viscera removed by the eviscerator standing on the eviscerating platform is dumped into one of the table compartments to be carried past an inspector as already described.

The endless inspection table is operated from the pulley 7, which is operated by the belt 7ᵃ connected with the drive pulley on the shaft 40. Rotation of the shaft 2 by the pulley causes rotation of the sprocket gear 8. A drive is thus transmitted to the platform shaft 19 through the chain 9 and the large sprocket gear 21. The platform 29 moves slower than the table 14, since the gear 21 is larger than the gear 8. The upper run of the platform is supported on the tracks 28 by means of the rollers 27. The sprocket wheels 25 on the shafts 19 and 22 act to move the platform chains 26.

Often viscera are accidentally dropped upon the moving platform 29 from which they may be removed and placed upon the traveling table 14. To keep the platform in a sanitary condition to prevent viscera falling thereon from becoming contaminated, steam or hot water from the pipe 30 is sprayed upon the moving platform which is thus thoroughly washed and sterilized.

I am aware that numerous details of construction may be varied through a wide range without departing from the principles of this invention, and I therefore do not purpose limiting the patent granted otherwise than necessitated by the prior art.

I claim as my invention:

1. The combination with a movable viscera inspection table, of a movable eviscerating platform disposed adjacent the loading end thereof.

2. In a meat handling and inspection machine, the combination with a movable viscera inspection table, of a movable eviscerating platform disposed adjacent the loading end thereof, and means for simultaneously operating said table and platform.

3. The combination with a viscera inspection table, of an eviscerating platform, and driving means connecting the table and platform.

4. The combination with a viscera inspection table, of an eviscerating platform, means for driving the inspection table, a gear driven by said means, a larger gear connected with said platform, and an endless chain trained around said gears to permit a drive from said driving means to be transmitted to said platform at a reduced rate of speed.

5. The combination with a viscera inspection table, of a movable eviscerating platform driven thereby, and means for washing and sterilizing said platform.

6. The combination with a meat handling machine, of a movable support upon which a butcher may stand to eviscerate carcasses, and means for sterilizing said support.

7. In a meat handling and inspecting machine, the combination with a movable inspection table and a movable eviscerating platform, of means connected therewith for simultaneously operating the same at different rates of speed.

8. The combination with a meat inspecting machine, of a movable eviscerating platform for supporting a butcher removing viscera from carcasses.

9. In a meat handling machine the combination with a movable inspection table and a movable carcass carrying conveyor, of a movable eviscerating platform adapted to support and carry a butcher while removing the viscera from carcasses to permit the viscera to be placed upon the movable table for inspection.

10. The combination with a movable carcass carrying conveyor, of a movable eviscerating platform adapted to carry a butcher to permit the viscera to be removed from the moving carcasses.

11. The combination with a movable viscera inspection table, of a carcass conveyor, and a movable eviscerating platform disposed between the table and said conveyor.

12. The combination with a movable viscera inspection table, of a carcass conveyor, means for driving the table and conveyor at the same rate of speed, an eviscerating platform disposed between said table and conveyor, and means for driving said platform from said table at a reduced rate of speed.

13. In a meat handling machine the combination of a plurality of movable supports connected to run at different speeds, means for dividing one of said supports into compartments, and means for sterilizing the other of said supports.

In testimony whereof I have hereunto subscribed my name in the presence of two subscribing witnesses.

ALVIN O. LUNDELL.

Witnesses:
EARL M. HARDINE,
FRED E. PAESLER.